United States Patent
De Koning et al.

(10) Patent No.: US 6,739,240 B2
(45) Date of Patent: May 25, 2004

(54) COFFEE-MAKING DEVICE WITH PRESSURE CONTROL

(75) Inventors: Abraham Gijsbert De Koning, Waarder (NL); Jan Cornelis Van Hattem, Amerongen (NL)

(73) Assignee: De Jong Duke, Sliedrecht (NL)

( * ) Notice: Subject to any disclaimer, the term of this patent is extended or adjusted under 35 U.S.C. 154(b) by 20 days.

(21) Appl. No.: 10/240,361

(22) PCT Filed: Apr. 2, 2001

(86) PCT No.: PCT/NL01/00272
§ 371 (c)(1),
(2), (4) Date: Sep. 30, 2002

(87) PCT Pub. No.: WO01/74212
PCT Pub. Date: Oct. 11, 2001

(65) Prior Publication Data
US 2003/0116026 A1 Jun. 26, 2003

(30) Foreign Application Priority Data
Mar. 31, 2000 (NL) .............................................. 1014817

(51) Int. Cl.⁷ ................................................ A47J 31/24
(52) U.S. Cl. ........................... 99/283; 99/299; 99/302 P
(58) Field of Search ....................... 99/283, 299, 302 R, 99/302 P, 287, 279

(56) References Cited

U.S. PATENT DOCUMENTS

| 4,583,449 A | 4/1986 | Dangel et al. |
| 5,186,096 A | 2/1993 | Willi |
| 5,622,099 A | 4/1997 | Frei |

FOREIGN PATENT DOCUMENTS

| DE | 2908881 | 9/1980 |
| EP | 0380450 | 8/1990 |
| NL | 8803146 | 12/1988 |

*Primary Examiner*—Reginald L. Alexander
(74) *Attorney, Agent, or Firm*—Kirkpatrick & Lockhart LLP; Anthony H. Handal

(57) ABSTRACT

Coffee-making device with a piston/cylinder unit, the piston (3) being driven by a crankshaft (11). A swivelling arm structure (13) is also driven by means of the crankshaft, with the interposition of a cam/cam follower mechanism. The swivelling arm structure is provided with a cover (19) for closing off the free end of the cylinder (2). The cover can be pressed onto the cylinder by means of a cam structure.

16 Claims, 5 Drawing Sheets

COFFEE-MAKING DEVICE WITH PRESSURE CONTROL

The present invention relates to a coffee-making device, comprising a coffee supply line, a hot water supply line with a pump, a beverage outlet with shut-off valve, and a coffee outlet, said coffee-making device comprises a brewing compartment for holding coffee, which brewing compartment is connected to said water supply line and to said beverage outlet, said brewing compartment comprising a cylinder in which a piston is capable of reciprocating.

Such a device is known from EP 0380450A2, which discloses a structure in which various types of coffee can be conveyed separately from various containers into the brewing compartment.

Ordinary coffee and espresso coffee have their own specific characteristics in the brewing process, such as, for example, the brewing quantity, the type of coffee, the water temperature, the contact time between coffee and water, and the pressure in the coffee bed.

If there is a desire for several brewing processes to be achieved in one brewing system, the type of coffee and the water temperature are easy to change for this.

It is much more difficult to switch over the pressure and the brewing quantity desired at this pressure.

It is the object of the present invention to provide a single brewing system by means of which it is possible to carry out different brewing processes. This object is achieved in a coffee-making device of the type described above in that said shut-off valve is designed to provide either a first passage with relatively small surface or a second passage with relatively large surface, and wherein said pump is designed to provide for an appropriate first, small volume displacement at high pressure and a second, large volume displacement at low pressure.

According to the invention, it is possible to prepare different types of coffee with a single coffee-making device by, apart from varying the sort and quantity of coffee, varying the throughput pressure of the water. The latter is controlled by the shut-off valve, which can provide for various passages, and thus can regulate the pressure in the brewing system. All the above is, of course, also dependent upon the pump. The term shut-off valve can be understood to mean one or more electrically operated shut-off valves.

According to an advantageous embodiment of the invention, the shut-off valve is, however, operated by the pressure of the water displaced by the pump. To this end, the shut-off valve comprises a restriction which reacts to pressure and is designed in such a way that at relatively low pressure a restriction with larger passage is present and at relatively higher pressure a restriction with smaller passage is present.

The valve structure is designed in such a way that at relatively low pressure a relatively large passage is present. When the pressure increases, the passage will become smaller.

In this way it is possible, without further mechanical components and/or controls, to build up a higher pressure in the brewing chamber depending on the pressure of the water that is moving through the coffee. In this way, the pressure in the brewing chamber can be varied simply by being controlled by the inlet pressure of the water. This makes it possible in a simple manner to prepare either "ordinary" coffee or espresso coffee, or variants of these.

It will be understood that the valve structure just described can also be used in combination with other coffee-making devices known in the prior art. After all, this valve structure is entirely independent of the remainder of the coffee-making devices. Of course, the fact is that the already simple structure of the coffee-making device is further simplified by using such a valve.

According to an advantageous embodiment of the invention, such a structure is used in the case of a coffee-making device comprising a cylinder with piston movable therein. In this case the water supply is connected to the volume present above said cylinder, and means for containing coffee are present near the free end of said cylinder. The term "above" in this description indicates the position away from the drive end.

According to a further advantageous embodiment of the invention, the piston comprises a piston head provided with a seal acting relative to said cylinder, an inlet channel being provided in said piston below said piston head, which inlet channel is sealed off relative to said cylinder and can be connected to said water supply in at least two different positions of said piston relative to said cylinder.

According to another advantageous embodiment, the channel is connected by way of a non-return valve to the compartment above the cylinder.

In order to ensure that the piston functions even in the case of varying amounts of coffee and also that the coffee-making device is of a simple design, according to an advantageous embodiment, provision is made for a coffee-making device comprising a housing with a cylinder in which a piston is provided, for compressing with the piston coffee placed on said piston, said piston being movable by means of a drive mechanism, and said drive mechanism being provided in said housing, and comprising a cover that can be placed on said cylinder, in order to bound a compression chamber with said cylinder and piston, means for introducing water into the compression chamber, means for discharging brewed coffee from the compression chamber, and also means for removing the compressed coffee tablet, said movable cover comprising a swivelling arm structure which is rotatable around an axis substantially perpendicular to the axis of said cylinder in such a way that said cover can be moved above and away from the end of the cylinder, which swivelling arm structure is capable of reciprocating substantially perpendicular to the axis of rotation thereof, in order to bring said cover into engagement in a sealing manner with said cylinder end, said drive mechanism being designed to operate both said piston and said swivelling arm, and comprising a rotary input shaft, and in which said drive mechanism for said piston is provided with means for converting a uniform rotating motion into a non-uniform reciprocating motion.

The closing and opening characteristic of the piston in the cylinder unit can be influenced, in other words optimized, by converting the uniform linear rotating motion of the drive motor in some way into a non-linear motion.

Such a non-linear motion characteristic of the piston can be obtained in any way known in the prior art. An example that can be mentioned is a curved disc which is driven by the rotary motor and in turn drives the piston. A certain opening and closing characteristic of the piston can be obtained through the special shape of the curve.

Another possibility is to use a crankshaft structure.

In this way a particularly compact structure can be obtained with a single drive motor. More particularly, the actual coffee-making process can be carried out irrespective of the "tablet thickness" of the coffee material. This means that it is possible to vary the quantity of coffee material without this affecting the functioning of the device, in other words various types of coffee can be made with one device without special measures as regards structure being necessary.

A particularly simple structure can be obtained by using a swivelling arm structure for moving the cover on the cylinder. Owing to the fact that the swivelling arm rotates substantially about the axis of the crankshaft, a particularly compact device is obtained.

Such a swivelling arm structure can be driven in any way known in the prior art. However, it is preferably driven by the crankshaft. If the structure is designed in a suitable manner, it is possible for it to be driven directly by the crankshaft, in other words without interposing gearwheels and other transmission mechanisms.

The reciprocating motion of the rocker arm in order to place the cover on the fee end of the cylinder in a sealing manner can also be carried out in any way known in the prior art. It is, however, preferably embodied by means of a cam/cam follower mechanism. This cam/cam follower mechanism is preferably likewise fitted on the crankshaft of the piston. By this measure also, further simplification of the coffee-making device according to the invention can be obtained. The coffee-making device can consequently be manufactured more cheaply, and fewer components will wear, and any parts that may have worn will be easier to replace. Cleaning can also be carried out in a simple manner.

The structure described above works in particular if the crankshaft rotates in different directions, in other words. It does not rotate in only one direction during a coffee-making operation. In particular, if a combination with cams/cam followers is envisaged for driving the swivelling arm structure, such a motion in different directions is advantageous. Of course, a corresponding, suitable control is present.

Certain parts of the motion process of the swivelling arm structure can be controlled by means of a spring or the like.

Of course, it is the case that the already simple structure of the coffee-making device is further simplified by using such a valve.

Further special features and details of the invention emerge from the appended drawings, in which.

Figure 1A:
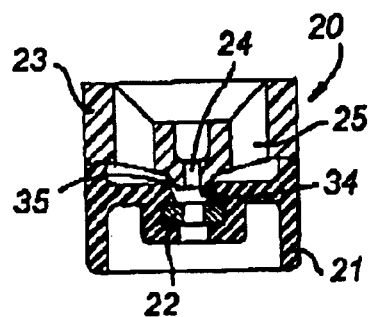
FIG. 1a shows a detail of valve 20 from FIG. 1.
Figure 1:
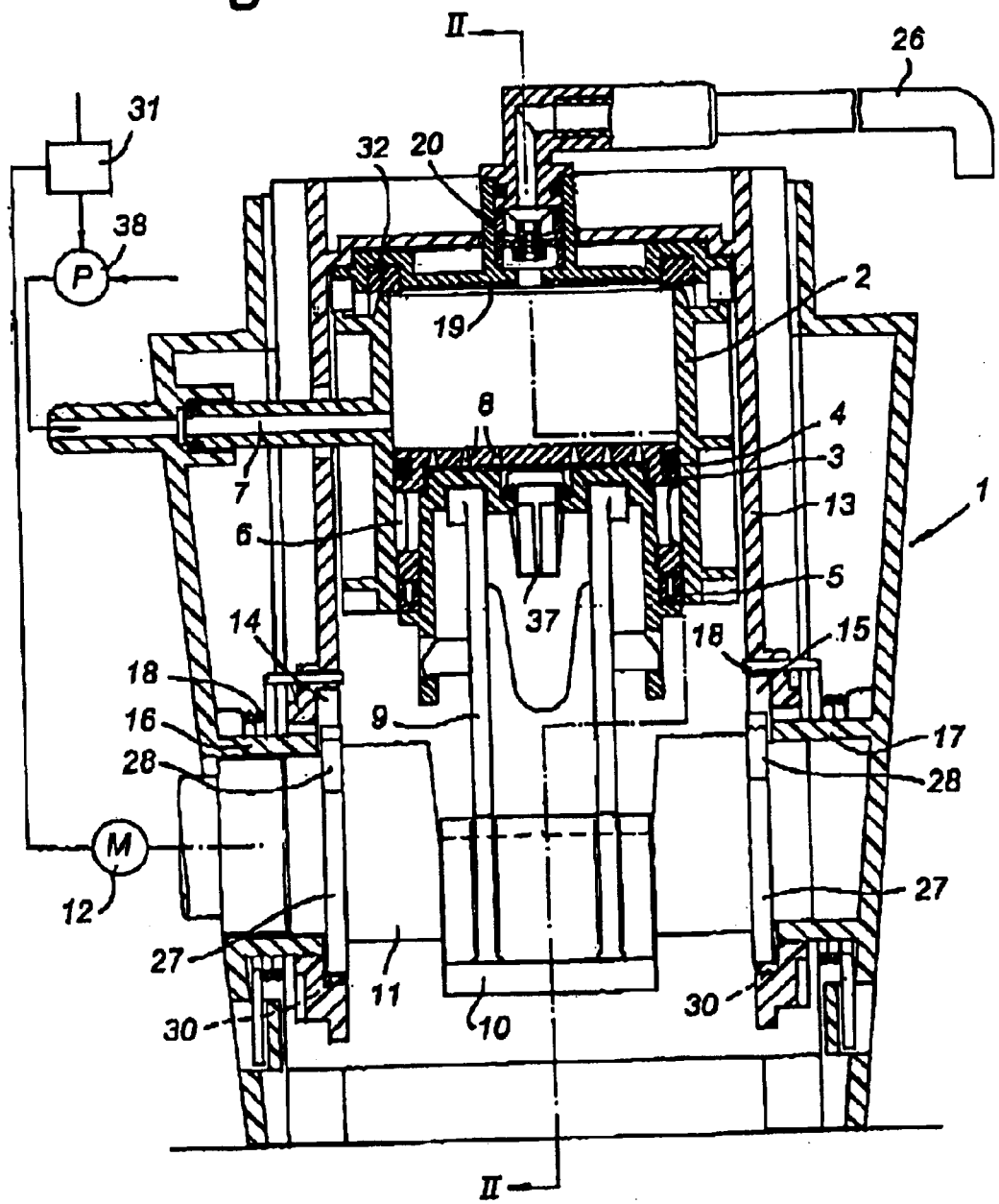
FIG. 1 shows in cross section the most essential components of the coffee-making device according to the invention.
Figure 2:
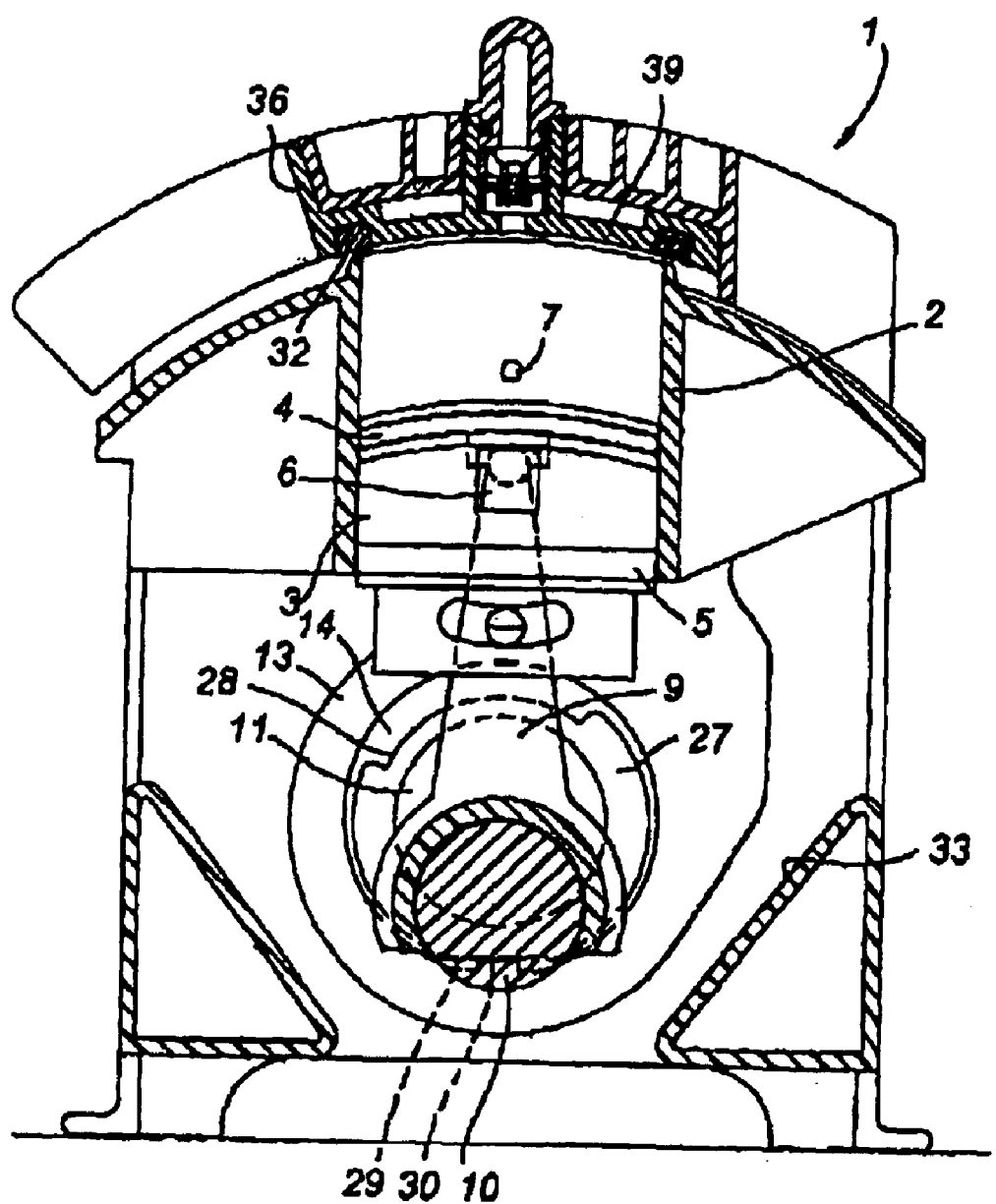
FIG. 2 shows a cross section in accordance with the line II in FIG. 1.

Only the part of a coffee-making device according to the invention that is essential for the invention is illustrated in the drawings. More particularly, only the part by means of which the coffee is compressed and where water is conveyed through the coffee is illustrated.

The device according to the invention can be used for making both espresso coffee and other types of coffee. However, it should be understood that the device can also be designed for preparing only one type of coffee.

The device according to the invention is indicated in its entirety by 1 in the figures. The device is composed of a housing (not shown in any further detail), part of which is formed by a cylinder 2. A piston 3 can move up and down inside the cylinder. Piston 3 is provided with a double seal. The top seal is indicated by 4, and the bottom seal is indicated by 5. A number of windows 6 are bounded by the two seals. These windows 6 can be brought into communication with a supply line 7 for warm, pressurized water. This water is provided by way of a diagrammatically illustrated pump 38. Windows 6 are in communication with dispensing apertures 8. The piston 3 is connected by way of piston rod 9 to a crank pin 10, which in turn forms part of a crankshaft 11, which is connected to a motor 12, illustrated only diagrammatically. A vent valve 33, which works in such a way that no vacuum can arise in the confined space above piston 3, is present in the piston 3. In other words, only overpressure can be produced by piston 3.

A rocker arm 13, provided with control apertures 14 and 15, is present. It can be seen from the drawing that the edge of the apertures 14, 15 engages on curved discs 27, to be described further. The rocker arm 13 is driven in the upward direction (in the drawing) by means of two coil springs 18. Rocker arm 13 is provided with a cover 39 in which a filter plate 19, provided with a filter 20, is fitted.

Filter plate 19 is provided with a sealing ring 32, which interacts with the free top end of the cylinder 2. A valve 20 is also fitted in filter plate 19. Valve 20 (FIG. 1a) is composed of an elastic bottom part 21, which can be made of, for example, a rubber-like material, and is provided with a restriction disc 22 with a diameter of, for example, 1.0 mm.

The top part of valve 20 is indicated by 23 and is composed of a relatively rigid material. An auxiliary restriction 24 and also a bypass channel 25 are present in this top part. The valve is connected to outlet 26 for the coffee, which in a manner not illustrated any further is connected to a pipe system, or in another way provides for the coffee to pass into the cup or other storage container. The bottom part 21 in this case is provided with a cone 34, and the top part is provided with a cone 35. When there is deformation of the bottom part 21, cones 34 and 35 engage each other.

A curved disc 27, already mentioned above, is fitted on the crankshaft 11. The curved disc is provided with recesses 28 and 29. The rocker arm 13 is provided with a cam 30 in control apertures 14 and 15, designed to engage the curved disc 27 or its recesses.

A control indicated diagrammatically by 31 is present.

The device described above works as follows:

During a first phase of the coffee-making process (FIG. 3) the rocker arm is situated in such a position that the aperture of cylinder 2 is clear.

In this position coffee 40 is placed in a manner not illustrated in any greater detail on the piston 3. The quantity of coffee can be dependent, for example, on the desired product: a small quantity for "ordinary" coffee, and a larger quantity for espresso coffee.

Figure 3:
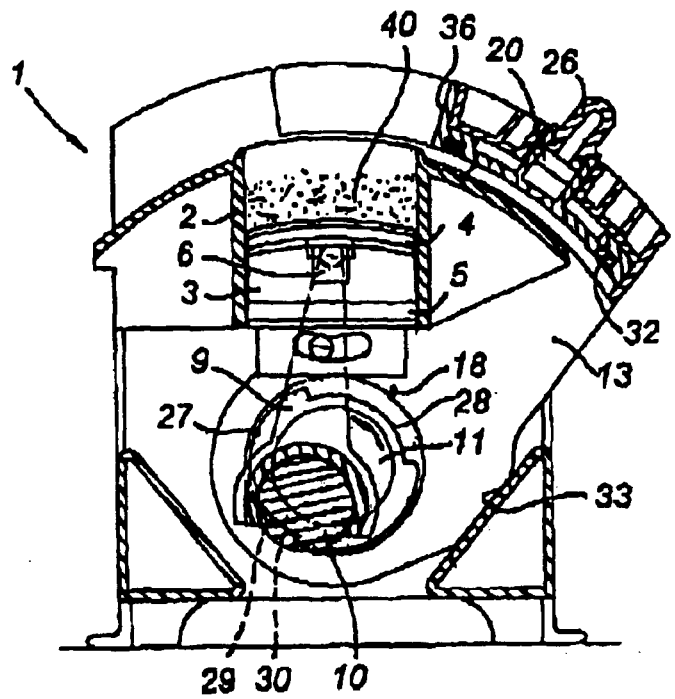
FIGS. 3–6 show the structure shown in FIG. 2 during various stages of the coffee-making process.

As can be seen from FIG. 3, the rocker arm 13 rests against stop 33 of the housing in which the device 1 according to the invention is accommodated. Cam 30 is situated in recess 29 and, through the action of coil springs 18, the rocker arm is pressed upwards in the figures. Apart from producing a spring pressure in the upward direction, the coil springs 18 also serve to generate a force to the left in the figures, in other words they try to move the rocker arm 13 into the position above the cylinder 2.

Starting from the position shown in FIG. 3, the motor 12 turns the crankshaft 11 to the left in the view shown. During this motion the piston 3 moves downwards, and at the same time the rocker arm 13 is moved along with it to the left until the latter hits a stop 36 in a manner not shown in any further detail.

Figure 4:
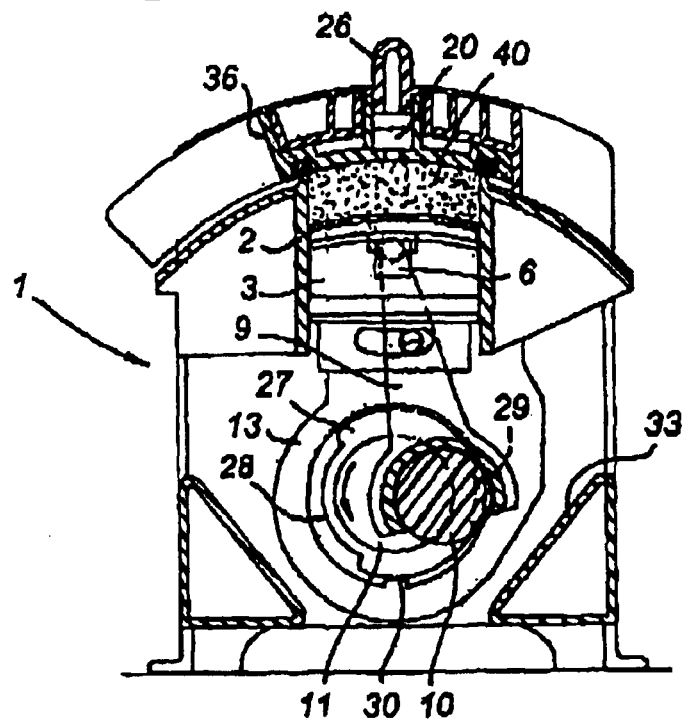

On further rotation of crankshaft 11 in the direction of the arrow shown in FIGS. 3 and 4, rocker arm 13 is pulled downwards. The fact is that further motion to the left is impossible, on account of the stop 36, so that on reaching the end of the recess 29 the cam 30 is pressed downwards by the curved disc, against the spring force of springs 18. As a result, the seal 32 of filter plate 19 engages the free end of cylinder 2.

Piston 3, driven by motor 12, which is still turning to the left, then moves upwards again, so that coffee 40 is compressed.

Depending on the quantity of coffee, the piston will be situated at a higher or lower level. The "height" of chamber 6 is, however, such that in this position the chamber 6 will always be in communication with the supply line 7. By means of control 31, compression of the coffee 40 is established. In other words, if, for example, the quantity of current supplies to motor 12 exceeds a certain value, it is established that sufficient compression is present and the motor is switched off, or less current is supplied to it, so that no further compression or less compression occurs.

Water is then supplied through line 7. This water is preferably heated water. Depending on the product that has to be prepared, the pressure of the water is selected with control 31. In other words, the output of the pump 38 is controlled by the control 31 in such a way that the desired product is obtained.

For traditional coffee, a relatively low pressure will be used, while for espresso coffee the pressure worked with will be higher (for example, higher than 7 atmospheres).

In both cases the warm water fed in will pass into the coffee by way of the chamber 6 through apertures 8, and will leave the coffee again by way of the filter plate 19, during which process the coffee is, of course, retained by the filter plate. Depending on the outlet pressure, valve 20 will function. At relatively low pressure little or no deformation of the rubber bottom part 21 will occur, in other words cone 34 is not pressed against cone 35. This means that the water encounters hindrance only from restriction 22, and the pressure in the coffee will remain relatively low.

If, however, water is supplied at higher pressure, this will result in a greater deformation of the bottom part 21 of valve 20, with the result that cones 34 and 35 seal on top of each other through deformation of the bottom part 21. Apart from relatively small restriction 22, the effect of the smaller restriction 24 (for example 0.7 mm) now comes into play.

Because of this narrower restriction, a higher pressure will be generated in the coffee, so that espresso can be prepared.

Figure 5:
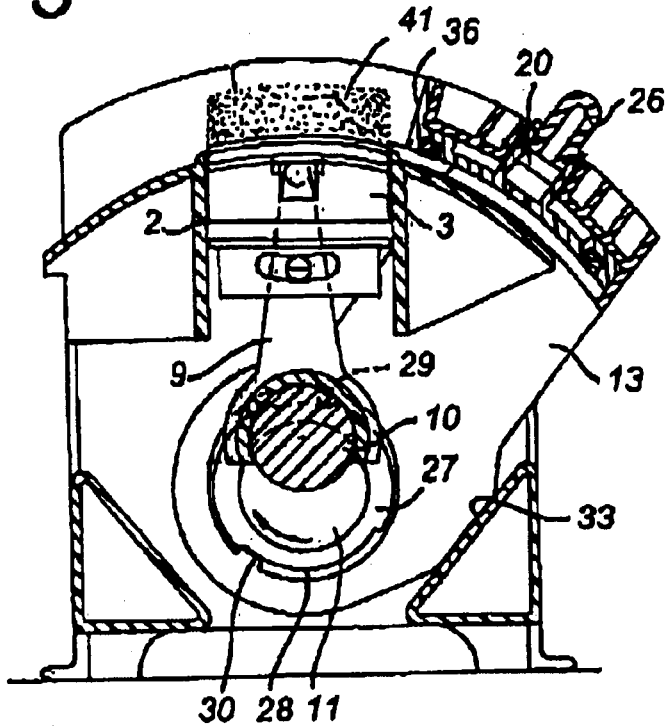
Figure 6:
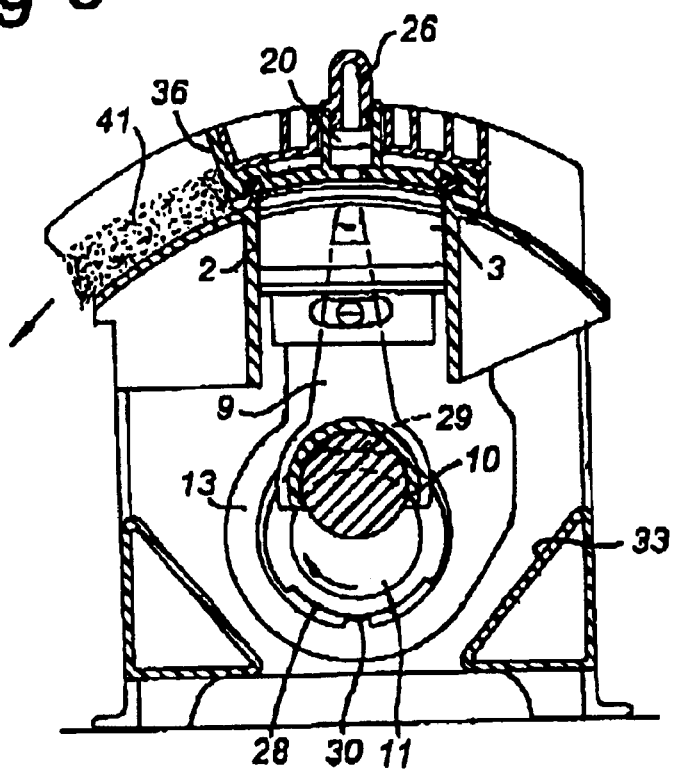

The coffee preparation process typically takes 10–35 seconds. After the water has been forced through the coffee tablet, the motor 12 is switched on again and moves in the opposite direction, as shown in FIGS. 5 and 6. During this return motion the "coffee-tablet" remains adhering to the cylinder, and not to the rocker arm. The rocker arm is provided with a scraper strip 36. The creation of vacuum between the coffee tablet and the top side of the piston is avoided by valve 33. This return motion occurs until cam 30 falls into recess 29. Owing to the spring force, rocker arm 13 moves upwards and there is no longer a seal between sealing edge 32 and the top end of cylinder 2. The rocker arm 13 then moves along with the crankshaft 11. The stripping motion along the coffee tablet can be carried out relatively simply. Rocker arm 13 moves to the position shown in FIG. 5 against the stop 33 of the housing. The rocker arm is then pressed downwards by the fact that crank 11 turn further and the "end" of recess 29 is reached. On further turning of the crank 11, the piston 3 now moves to its top dead centre, so that the coffee tablet 41 is moved to above the level of cylinder 2.

Cam 30 then goes into recess 28. Under the influence of coil springs 18, rocker arm 13 not only moves upwards as a result, but also shoots to the left, as shown in FIG. 6. In the process, the coffee tablet is removed to the left by scraper strip 36. On further rotation, when there is engagement with the "end" of recess 28, cam 30, and thus rocker arm 13, is turned to the right until the initial position shown in FIG. 3 is reached.

Figure 7:
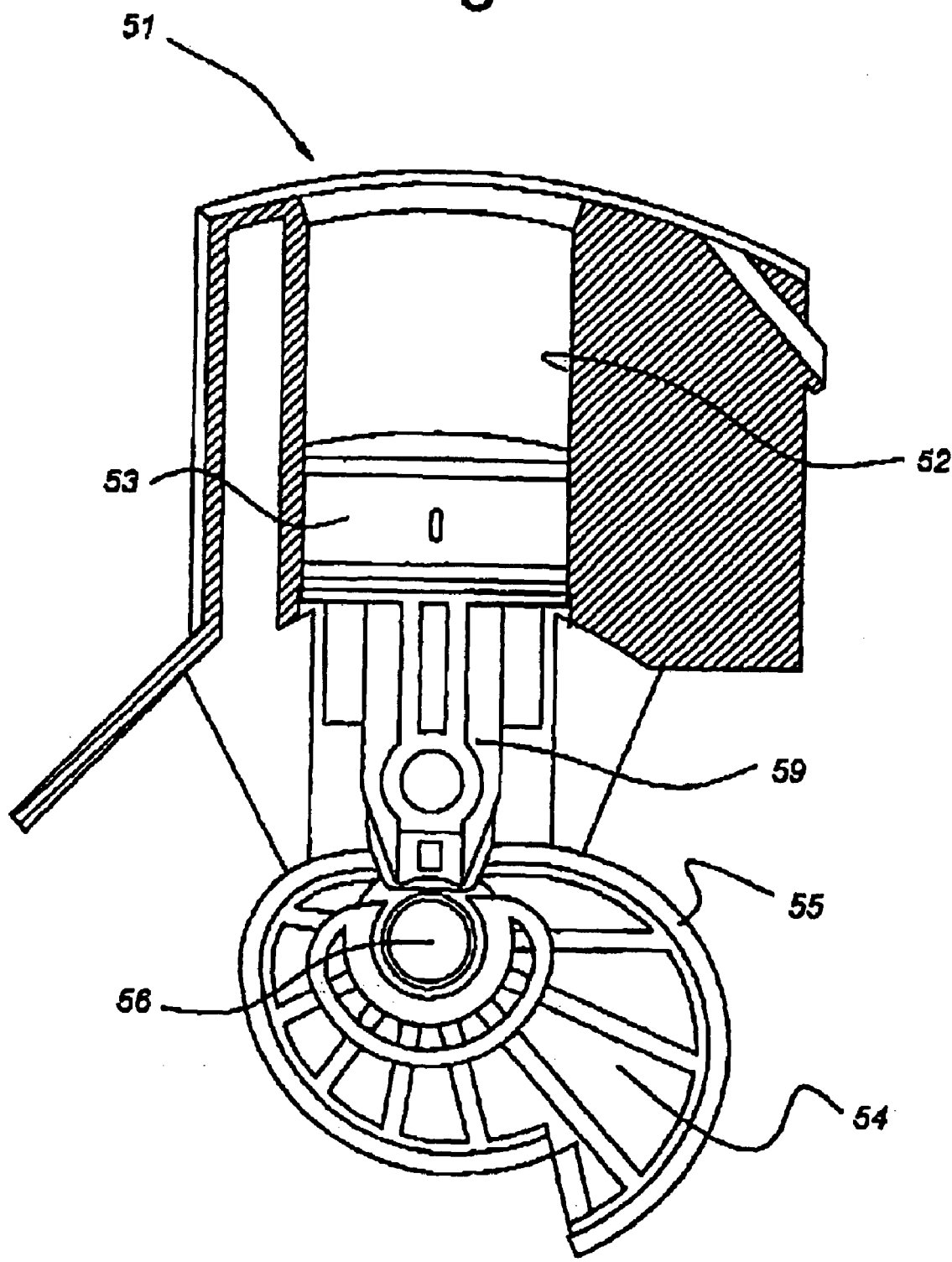
FIG. 7 shows an alternative for the drive of the piston and swivelling arm structure, as illustrated in the previous figures.

FIG. 7 shows very diagrammatically a variant of the device described above. This device is indicated in its entirety by 51 and comprises a cylinder 52 with a piston 53 provided therein. This piston is provided with a rod 59, which is rigidly connected to it and provided on the end with cams (not shown in any further detail) which run in a curved track 55 of a curved disc 54. The curved disc 54 is provided with a central shaft 56, which is driven by a central drive motor (not shown). The swivelling arm is likewise driven by this central drive motor, in the manner described above. In this case the structure with curved disc 27 and the like shown by means of the earlier figures can be used, and the latter may be integral with curved disc 54 or otherwise.

What is claimed is:

1. Coffee-making device (1, 51), comprising a coffee supply line, a hot water supply line (7) with a pump, a drink outlet (26) with shut-off valve, and a coffee outlet, said coffee-making device comprises a brewing compartment for holding coffee, which brewing compartment is connected to said water supply line and to said beverage outlet, said brewing compartment comprising a cylinder in which a piston is capable of reciprocating, characterized in that said shut-off valve is designed to provide either a first passage with relatively small surface or a second passage with relatively large surface, and in that said pump is designed to provide an appropriate first, small volume displacement at high pressure and a second, large volume displacement at low pressure.

2. Coffee-making device according to claim 1, in which said shut-off valve comprises a restriction which reacts to pressure, and is designed in such a way that at relatively low pressure a restriction with larger passage is present and at relatively higher pressure a restriction with smaller passage is present.

3. Coffee-making device according to claim 1, in which said shut-off valve comprises two electrically controllable valves.

4. Device according to claim 1, in which said brewing compartment comprises a cylinder in which a piston is capable of reciprocating.

5. Coffee-making device according to claim 4, comprising a cylinder with piston movable therein, in which said water supply is connected to the volume present above said cylinder, and means for containing coffee are present near the free end of said cylinder.

6. Coffee-making device according to claim 5, in which said piston comprises a piston head provided with a seal (4) which works relative to said cylinder, an inlet channel (6) being provided in said piston below said piston head, which inlet channel is sealed off relative to said cylinder and can be connected to said water supply line (7) in at least two different positions of said piston relative to said cylinder.

7. Coffee-making device according to claim 6, in which said inlet channel is connected by way of a non-return valve (33) to the compartment above said cylinder.

8. Coffee-making device (1) according to claim 1, comprising a housing with a cylinder (2) in which a piston (3) is provided, for compressing with the piston coffee placed on said piston, said piston being movable by means of a drive mechanism (10, 11) and said drive mechanism being provided in said housing, and comprising a cover (39) that can be placed on said cylinder, in order to bound a compression chamber with said cylinder and piston, means for introducing water into the compression chamber, means for discharging brewed coffee from the compression chamber, and also means for removing the compressed coffee tablet, said movable cover comprising a swivelling arm structure (13) which is rotatable around an axis substantially perpendicular to the axis of said cylinder in such a way that said cover can be moved above and away from the end of the cylinder, which swivelling arm structure is capable of reciprocating substantially perpendicular to the axis of rotation thereof, in order to bring said cover into engagement in a sealing manner with said cylinder end, said drive mechanism being designed to operate both said piston and said swivelling arm and comprising a rotary input shaft, characterized in that said drive mechanism for said piston is provided with means for converting a uniform rotating motion into a non-uniform reciprocating motion.

9. Coffee-making device according to claim 8, in which said means comprise a rotating curved disc and engagement means connected to the piston and engaging upon the curve of said disc.

10. Coffee-making device according to claim 8, in which said means comprise a crankshaft, in which the axis of rotation of said swivelling arm structure comprises the axis of said crankshaft, and in which said piston is connected to the driving rod of said crankshaft.

11. Coffee-making device according to claim 10, in which said swivelling arm structure (13) can be driven by said crankshaft.

12. Coffee-making device according to claim 8, in which a cam/cam follower mechanism is present for transmitting said reciprocating motion.

13. Coffee-making device according to claim 9, in which said cam or cam follower is fitted on said crankshaft and said cam follower or cam is fitted on said swivelling arm structure.

14. Coffee-making device according to claim 8, comprising spring means for driving said swivelling arm structure into the position above the free end of said cylinder.

15. Coffee-making device according to claim 8, in which said swivelling arm structure is provided with means (36) for discharging said coffee tablet.

16. Coffee-making device according to claim 8, in which said drive mechanism is designed to rotate in two directions.

* * * * *